（12） United States Patent
Kitamura et al.

(10) Patent No.: US 11,660,172 B2
(45) Date of Patent: May 30, 2023

(54) DENTAL ZIRCONIA BLANK HAVING HIGH RELATIVE DENSITY

(71) Applicant: SHOFU INC., Kyoto (JP)

(72) Inventors: Toshio Kitamura, Kyoto (JP); Rieko Aiba, Kyoto (JP)

(73) Assignee: SHOFU INC., Kyoto (JP)

( * ) Notice: Subject to any disclaimer, the term of this patent is extended or adjusted under 35 U.S.C. 154(b) by 0 days.

(21) Appl. No.: 15/805,396

(22) Filed: Nov. 7, 2017

(65) Prior Publication Data

US 2018/0125616 A1    May 10, 2018

(30) Foreign Application Priority Data

Nov. 7, 2016 (JP) .............................. JP2016-217662
Oct. 31, 2017 (JP) .............................. JP2017-209868

(51) Int. Cl.
*A61C 13/00* (2006.01)
*A61C 13/08* (2006.01)

(52) U.S. Cl.
CPC ...... *A61C 13/0022* (2013.01); *A61C 13/0004* (2013.01); *A61C 13/082* (2013.01)

(58) Field of Classification Search
CPC ................................................ A61C 13/0022
See application file for complete search history.

(56) References Cited

U.S. PATENT DOCUMENTS

| 8,936,848 | B2 * | 1/2015 | Jung ...................... B32B 18/00 428/211.1 |
| 10,391,671 | B2 * | 8/2019 | Tholey .................... B28B 1/008 |
| 2005/0164045 | A1 | 7/2005 | Rothbrust et al. |
| 2008/0064011 | A1 | 3/2008 | Rheinberger et al. |
| 2011/0189636 | A1 | 8/2011 | Thiel et al. |
| 2012/0094823 | A1 | 4/2012 | Watanabe et al. |
| 2013/0059272 | A1 * | 3/2013 | Jahns ................... A61K 6/0276 433/199.1 |
| 2013/0224454 | A1 | 8/2013 | Jung et al. |
| 2014/0328746 | A1 | 11/2014 | Yamada et al. |
| 2015/0282905 | A1 * | 10/2015 | Jahns ................... A61K 6/0245 433/167 |
| 2015/0315086 | A1 * | 11/2015 | Kawamura .............. A61K 6/16 501/134 |
| 2016/0081777 | A1 | 3/2016 | Yamada et al. |

FOREIGN PATENT DOCUMENTS

| EP | 2 000 109 | 12/2008 |
| EP | 3 108 849 | 12/2016 |
| JP | 4-505113 | 9/1992 |
| JP | 2004-35332 | 2/2004 |
| JP | 2011-528597 | 11/2011 |
| JP | 2012-130798 | 7/2012 |
| JP | 2014-218389 | 11/2014 |
| JP | 2017-185163 | 10/2017 |
| KR | 10-2017-0098137 | 8/2017 |
| WO | 90/13268 | 11/1990 |
| WO | 02/09612 | 2/2002 |
| WO | 2005/070322 | 8/2005 |
| WO | 2011/016325 | 2/2011 |
| WO | 2013/055432 | 4/2013 |
| WO | 2013/062889 | 5/2013 |
| WO | 2015/051095 | 4/2015 |
| WO | 2015/084931 | 6/2015 |

OTHER PUBLICATIONS

Extended European Search Report dated Feb. 14, 2018 in corresponding European Patent Application No. 17200298.2.
Notice of Opposition dated Jun. 17, 2020 in corresponding European Patent Application No. 17200298.2, with partial English translation.

* cited by examiner

*Primary Examiner* — William D Young
(74) *Attorney, Agent, or Firm* — Wenderoth, Lind & Ponack, L.L.P.

(57) ABSTRACT

The present disclosure relates to a dental cutting zirconia blank having high relative density for preparing a dental restoration. More specifically, the present disclosure relates to a dental cutting zirconia blank which consists of a zirconia ceramics used for the cutting with the CAD/CAM system in the dental field, a semi-sinter zirconia blank (pre-sintered body) of which has high relative density, and which can provide a prosthesis device having high aesthetics after sintering. There is provided a dental cutting zirconia blank wherein the dental cutting zirconia blank has at least one layer consisting of zirconia powder containing 4 to 15 mol % of yttria or erbium oxide as a stabilizer, a relationship among pre-sintering density, final-sintering density and relative density satisfies the following relation:

$54 \leq \text{Relative density}(\%) = \{(\text{Pre-sintering density})/(\text{Perfect-sintering density})\} \times 100 \leq 70$.

10 Claims, No Drawings

DENTAL ZIRCONIA BLANK HAVING HIGH RELATIVE DENSITY

CROSS-REFERENCE TO RELATED APPLICATIONS

This application is based on and claims the benefit of priority from Japanese Patent Application Serial No. 2016-217662 (filed on Nov. 7, 2016), the contents of which are hereby incorporated by reference in their entirety.

BACKGROUND OF THE INVENTION

Field of the Invention

The present disclosure relates to a dental cutting zirconia blank which includes zirconia ceramics used for cutting and machining with the CAD/CAM system in the dental field, a semi-sinter zirconia blank (pre-sintered body) of which has high relative density, and which can provide a prosthesis device having high aesthetic property after sintering.

Description of the Related Art

In the conventional dental treatment of a defect part of the dental crown, the prosthetic restoration using a casting crown bridge and an artificial tooth has been performed generally, and specific examples include the clinical application of a porcelain baked crown bridge which has both functionality and aesthetic property, reproduces a tooth crown shape and is prepared by baking porcelain on the surface of the metal frame made from a casting alloy for porcelain baking.

In addition, from the point of view of no fear of the metal allergy, from the point of view of the price remarkable rise to depend on the noble metal market price and from the point of view of aesthetic property which can imitate the color tone of the nature tooth, a prosthesis device, which is so-called all ceramics, prepared by the dipping method using such as alumina, aluminosilicate glass, lithium disilicate glass or by the press method using ceramics ingot, has attracted attention, and, the prosthesis restoration using it has been increased.

In recent years, techniques to prepare a prosthesis device by the cutting and machining which uses the dental CAD/CAM system spread rapidly and it is becoming possible to easily prepare prosthetic devices by milling the blanks such as a block and a disk which are made of zirconia, alumina, aluminosilicate glass, and lithium disilicate glass. In addition, there is a zirconia pre-sintered body which has adjusted strength and the hardness which are advantageous for cutting and machining, and is prepared by pre-sintering at low sintering temperature. The zirconia pre-sintered body is not subjected to the perfect sintering which is performed on prosthesis devices to be used in oral cavity in order to improve cutting property in zirconia which is frequently used in the clinical as high-strength ceramics.

In this pre-sintered body, the relative density which is expressed by following formula is set lower than that of perfect-sintered body. In this set, abrasion and the durability of the machining tool in cutting and machining are taken into account.

Relative density(%)={(Pre-sintering density)/(Perfect-sintering density)}×100

For such materials, from the point of view that zirconia has the bending strength which is used in the frame of bridges more than 4 units, a tetragonal partially stabilized zirconia containing 3 mol % yttria is put to practical use. Examples of the 3 mol % yttria containing zirconia include zirconia which is added with a very small amount of alumina for improving sinterability and restraining the low temperature deterioration. In addition, the use of zirconia in which alumina content is controlled to very small amount in order to improve optical transparency for using as a molar tooth full crown is proceeded. Furthermore, in order to use as a front tooth full crown, zirconia in which optical transparency is highly designed by increasing the content of yttria, which is added as a stabilizer, to 5-6 mol % also has been used.

Examples of zirconia include the zirconia having the color tone of white and the coloration zirconia having the color tone adjusted to the color which is close to the color tone of the natural tooth. In the color tone of the natural tooth, the color darkens and the saturation C* increases from the cut end portion which corresponds to the enamel of the tooth to the cervical portion. Therefore, in order to approximate the color tone of the cut end portion and the cervical portion of the natural tooth, the technique for molding a dental cutting zirconia blank having a multilayer structure which is imparted with the gradation of the color by stacking progressively zirconia powders, which have different color tone including the enamel color of the cut end portion and the cervical color, in the layer form has been used.

The feature of a dental cutting and machining ceramics blank having a multilayer structure is that a plurality of layers having different color tones, different transparencies, different materials and the like are stacked in various thickness.

However, in the case of sintering a zirconia blank having high aesthetics, because the amount of the alumina which is a sintering aid is decreased, there are problems that sinterability is poor and sintering takes much time. Generally, around 12 hours are required in each step of a temperature rising, a retention and a cooling. Therefore the work takes much time of the dental technician.

The zirconia blank generally sinters in an electric furnace. In this case, the zirconia blank is heated at 300° C./hour or less of temperature rising rate, retained for about 2 hours, and is slow cooled in the electric furnace.

On the other hand, methods of sintering in a short time include a method using a microwave, a heat plasma, and a high frequency. However, there are problems that the high-speed sintering of dental zirconia worsens compatibility and is inferior in color develop ability. Particularly, when a dental zirconia blank having a multilayer structure is sintered by the high-speed sintering, there are problems that sintering defectiveness and color development defectiveness occur.

National Publication of International Patent Application No. 1992-505113 provides a block body having a layer structure including a plurality of curved layers, and describes a method for preparing a tooth crown shape by milling (cutting) and machining this material. The foregoing document describes, for example, the imitation of the form of a natural tooth adopted in the structure of layers, and the imitation of the cervical color or the enamel color adopted in the color tone of the layers. However, the practical application of the foregoing technique requires a high level production technique to impart curved layer structure to the block body, and is anticipated to be costly.

International Publication No. WO 2002/09612 describes a technique of a block having a layer structure including a plurality of layers. This technique is characterized in that the color tones of the respective layers are made to imitate the ivory color or the enamel color, and the layer structure is curved. The prosthetic device obtained by milling and machining of the block body due to the foregoing technique approximates the layer structure of a natural tooth. However, the technical description of the color tone design of each layer in the foregoing document is limited only to the imitation to the cervical color and the enamel color. In the design of the curved layer structure, the layer structure based on the patterned curved surfaces is assumed in consideration of practical application. However, the patterned layer structure requires a certain degree of multilayer (four to five layers) in order to reproduce the color tone of a natural tooth. In addition, further definition of color tone of each layer is necessary as well as a gradual laminating from light color to a dark color.

Japanese Unexamined Patent Application Publication No. 2004-35332 describes a ceramic block technique in which two or more materials having different color tones are mixed to prepare a prosthetic device. Specifically, the prosthetic device is a ceramic block having a layer structure including a plurality of layers, wherein an intermediate color is prepared by mixing two or more materials having different color tones, and while the color tone of the intermediate color is being varied, layer structures are formed. However, because the relationship of color tones is not appropriate in the foregoing technique, the designation of the color tone of the intermediate color is necessary in order to implement the reproduction of the color tone that is equal to a natural tooth.

National Publication of International Patent Application No. 2011-528597 describes a forming member composed of two components different in color tone. Specifically, the forming member is composed of a cervical color component layer and an enamel-color component layer, and the shape of the interface between the respective component layers is prescribed in detail as a parabolic shape. Such a prescription of the interface shape as a parabolic shape allows a cervical color structure and an enamel color structure approximating a natural tooth to be imparted to the prosthetic device subjected to milling and machining. For the practical application of the foregoing technique, a method using a die/mold having a parabolic shape is quoted. However, this method requires a sequential molding of a first layer and a second layer, accordingly usable materials are limited, and there may occur a large number of technical problems related to molding, for example uniform press pressure is hard to apply. In the foregoing document, there is no knowledge about the layer structure having three or more layers.

Japanese Unexamined Patent Application Publication No. 2012-130798 describes a multicolored compact having a layer structure. The technique described in the foregoing document is characterized in that there are two middle layers different in color between two main layers having different colors, the color variation of these middle layers is in the direction opposite to the color variation direction of the main layers, each of the middle layers is as thin as 0.2 to 0.4 mm in thickness, and thus, the color variation of the whole of the compact looks like transitional. This utilizes the color vision illusion of an observing human, and thus, the color variation in the whole of the layer structure is perceived continuously. However, in a compact having a limited thickness in the preparation of a dental crown prosthetic device, the impartment of many middle layers having 0.2 to 0.4 mm of thickness leads to a high difficulty in technical aspect, and is disadvantageous in the aspect of production cost. Further, the brightness and the saturation of the color tone in the enamel layer, the cervical layer and the middle layer are not defined and the specific presentation for providing the color tone similar to a natural tooth is not disclosed.

Japanese Unexamined Patent Application Publication No. 2014-218389 describes a technique for the color tone of a zirconia sintered body. Specifically, the technique is characterized in that the color tones of two points in the sintered body are respectively defined, and the increase-decrease tendency between the two points is not varied. The foregoing technique defines the color tones of the positions spaced from the surface layers of the one end and the other end by 25% and the color tones of the middle layer of the positions spaced from the surface layer by 45% and 55%. However, a technique to provide more appropriate color tone at more appropriate position has been required in order to prepare a prosthetic device similar to a natural tooth. Particularly, in the crown shape of the molar tooth, the color tone having the saturation higher than that of the enamel color is required in the pit and fissure part, and it has been required to define a color relationship between layers.

International Publication No. WO 2015/051095 describes a blank for cutting and machining having a two-layer structure or a three-layer structure. Specifically, this document discloses a technique of transitional expression of the color tone variation between the layers by minutely prescribing the curve design of the boundary surface(s) between the layers. In the color tone design of each layer in the foregoing technique, the relationship between the transparency and the color tone of each layer is considered. However, with respect to the design of the transparency and the color tone of each layer, only the concept is stated and no clear setting is presented. In other words, neither design of the transparency difference between the layers nor the design of the color difference between the layers is considered at all. This is because the foregoing technique has solved the transferability of the color tones between the layers through the curve design of the boundary surface(s) between the layers. Even in the foregoing technique, because the layer structure includes curved surfaces, various restrictions occur regarding the technical aspect and the cost aspect in the production of the layer structure.

International Publication No. WO 2013/062889 describes a zirconia blank having high relative density regarding ceria-stabilized zirconia. However, there are problems that the hardness and strength are insufficient in the ceria-stabilized zirconia. Further, a multilayer structure is not clearly shown in this document.

International Publication No. WO 2011/016325 discloses the method for high-speed sintering a zirconia blank. This document describes that preferable relative density is 92% or more and preferable amount of yttria is within the range of 7 to 30 mol % in this method. However, there is a problem in this method that the strength is low although high transparency is exhibited. Further, there is a problem that it is hard to process with the dental CAD/CAM machining device in the case that relative density is 92% or more.

SUMMARY OF THE INVENTION

Technical Problem

Any of the above-described conventional techniques relates to the increase in the relative density, the color tones and the layer structures of the zirconia which is cut and machined by the dental CAD/CAM system. In these conventional techniques, since the technical contents of the compatibility in high-speed sintering, and of the setting of the appropriate thickness of the enamel layer, the relationship of position and the color tone design of the middle layer in a multilayer structure are insufficient, it has been not able to prepare the dental prosthesis devices having the color tone which is close to the color tone of the natural tooth in a short time. Therefore, a dental cutting zirconia blank which can prepare a dental prosthesis device having the color tone which is close to the color tone of the natural tooth in a shorter time than conventionally has been required.

Particularly, in the zirconia blank having a multilayer structure, due to the multilayer structure, demanded sintering characteristics may be different in each layer having the different color tone. For example, there has been a problem that it is difficult to uniformly sinter since the pre-sintering characteristics demanded in the enamel layer is different from the pre-sintering characteristics demanded in the cervical layer.

In order to obtain aesthetic prosthesis in dental, it is required in the dental crown form of a molar tooth that a color tone of the occlusal plane view which is in a field of view when an oral cavity is observed from the outside is reproduced. In the occlusal plane, the color tone having the saturation C*higher than that of the enamel color is required in the pit and fissure part, and therefore a dental cutting zirconia blank in which the appropriate relationship of position and the appropriate color tone design are set in the whole middle layer has been required.

In addition, in the tooth crown of the front tooth, it has been expected that the color tone of the enamel portion is positioned close to the cutting edge and the color tone of the position spaced from a surface of the dental crown by ⅓ of a dimension of the dental crown is an approximately middle color of the enamel color and the cervical color. However, in the above described prior arts, since the setting of the appropriate thickness of the enamel layer, and the relationship of position and the color tone design of the middle layer in the ceramic blank for dental cutting and machining are not shown, it has been not able to reproduce the color tone which is close to the color tone of the natural tooth. Therefore a dental cutting zirconia blank in which the appropriate layer structure and the appropriate color tone design of the enamel layer and the middle layer are designed in order to reproduce the color tone which is close to the color tone of the natural tooth has been required.

In addition, when the conventional semi-sintered zirconia blank which is obtained by semi-sintering (pre-sintering) is high-speed sintered, there has been a problem that sintering defectiveness and color development defectiveness occur by rapid temperature rise. In addition, there has been a problem that the breaking of the prosthesis device and the crack occur by rapid cooling.

Solution to Problem

The present disclosure provides a dental cutting zirconia blank wherein, wherein, the dental cutting zirconia blank has at least one layer consisting of zirconia powder containing 4 to 15 mol % of yttria and/or erbium oxide as a stabilizer, the dental cutting zirconia blank is used in the oral cavity by perfect sintering to a usable state in the oral cavity after cutting and machining which are performed after pre-sintering, and a relationship among Pre-sintering density which indicates density of the dental cutting zirconia blank after pre-sintering, Perfect-sintering density which indicates density of the dental cutting zirconia blank in use in the oral cavity and Relative density satisfies the following relation:

$$54 \leq \text{Relative density}(\%) = \{(\text{Pre-sintering density})/(\text{Perfect-sintering density})\} \times 100 \leq 70$$

In the present disclosure, it is preferable that the relative density of the dental cutting zirconia blank is preferably within the range of 55 to 65%, and more preferably within the range of 56 to 60%.

In the present disclosure, it is preferable that the dental cutting zirconia blank consists of a multilayer structure having different color tones.

In the present disclosure, it is preferable that the dental cutting zirconia blank has at least three layers, preferably four or more layers, including E layer which has the lowest saturation and is positioned on one of the uppermost layer and the lowermost layer of the dental cutting zirconia blank, C layer which has the highest saturation and is positioned on the other of the uppermost layer and the lowermost layer of the dental cutting zirconia blank and M layer which is positioned between the E layer and the C layer, and the saturations (E layer: $C_E$, C layer: $C_C$, M layer: $C_M$) and the brightnesses (E layer: $L_E$, C layer: $L_C$, M layer: $L_M$) in each layer satisfy the following relations:

$$\{(L_E+L_C)/2\} \times 0.97 < L_M < \{(L_E+L_C)/2\} \times 1.03$$

$$\{(C_E+C_C)/2\} \times 0.93 < C_M < \{(C_E+C_C)/2\} \times 1.07$$

$$C_C > C_M > C_E$$

In the present disclosure, the saturations are calculated by following expression using L value, a value and b value which are measured by the colorimeter, and the brightness is L value.

Saturation $C = \sqrt{(a^2+b^2)}$

In the present disclosure, it is preferable that the chromaticities of E layer ($L_E$, $a_E$, $b_E$) based on the L*a*b* colorimetric system satisfy the following relations:

$$65.0 \leq L_E \leq 82.0$$

$$-4.0 \leq a_E \leq 2.0$$

$$0.0 \leq b_E \leq 20.0$$

In the dental cutting zirconia blank of the present disclosure, it is preferable that the E layer is positioned from the surface of the dental cutting zirconia blank of the E layer-side to a position spaced from the surface of the dental cutting zirconia blank of the E layer-side by 15 to 30% of the dimension between the surface of the dental cutting zirconia blank of the E layer-side and the surface of the dental cutting zirconia blank of the C layer-side, and the M layer is positioned from a position spaced from the surface of the dental cutting zirconia blank of the E layer-side by more than 15% to a position spaced from the surface of the dental cutting zirconia blank of the E layer-side by 40% or less of the dimension between the surface of the dental cutting zirconia blank of the E layer-side and the surface of the dental cutting zirconia blank of the C layer-side.

In the dental cutting zirconia blank of the present disclosure, it is preferable that the M layer and the E layer are adjacent each other.

In the dental cutting zirconia blank of the present disclosure, it is preferable that the E layer and the C layer have 80 or more Vickers hardness (load: 1 kgf).

The present disclosure provides a dental prosthesis device prepared by cutting and machining the above described dental cutting zirconia blank using dental CAD/CAM system, and heating at 50° C./minute or more of temperature rising rate and sintering.

Advantageous Effects of Invention

The present disclosure may provide a dental cutting zirconia blank which can prepare a dental prosthesis device having the color tone which is close to the color tone of the natural tooth in a shorter time than conventionally.

Particularly, the present disclosure provides a dental cutting zirconia blank which can provide a dental prosthesis device having sinterability and color developability, which are similar to those in normal sintering condition, in both an enamel layer and a cervical layer by high-speed sintering.

DETAILED DESCRIPTION OF THE PREFERRED EMBODIMENTS

Now a specific description of the present disclosure is given.

Firstly, a description of the relative density that should be calculated in the present disclosure is given.

The dental cutting zirconia blank of the present disclosure becomes a perfect sintered body (fully sintered body) by pre-sintering a dental zirconia powder which has, for example, the layer structure, cutting and machining the pre-sintered body and perfect sintering (full sintering) the cut pre-sintered body in order to cancel fragility for using in an oral cavity. The dental cutting zirconia blank of the present disclosure becomes available in the oral cavity by becoming a perfect sintered body. In the conventional dental cutting zirconia blank, when the dental cutting zirconia blank becomes a perfect sintered body which is in a condition available in the oral cavity, there has been problem that the dental cutting zirconia blank has very high hardness and is hard to cut. Therefore, it is preferable that a dental cutting zirconia blank is pre-sintered at 900 to 1100° C. which is lower than the temperature of the perfect sintering. The dental cutting zirconia blank is pre-sintered in this temperature range, and is processed using a dental CAD/CAM device. Thereafter, a perfect sintered body is obtained by sintering at the temperature of the perfect sintering which is generally a manufacturer designated sintering temperature (e.g., 1450 to 1550° C.).

The density of the perfect sintered body prepared by this method is higher than the density of the pre-sintered body. In addition, the pre-sintered body includes pores and therefore is a porous body. In the present disclosure, the density calculated by apparent volume and mass of the pre-sintered body is called as pre-sintering density. In addition, perfect sintering density of the present disclosure is calculated by the dimensional measurement and the mass measurement of the perfect sintered body. By using the pre-sintering density and the perfect sintering density, relative density is calculated by following formula. In the conventional dental cutting zirconia blank, the relative density is usually set in around 50%.

Relative density(%)={(Pre-sintering density)/(Perfect-sintering density)}×100

In the present disclosure, this relative density is within the range of 54 to 70%, preferably within the range of 55 to 65%, and more preferably within the range of 56 to 60%.

As the zirconia powder constituting the dental cutting zirconia blank, zirconia powder containing a stabilizer, which is called partially stabilized zirconia, is generally used, and calcium oxide, magnesium oxide, yttria, titanium oxide, erbium oxide, ceria are used for the stabilizer. The dental cutting zirconia blank of the present disclosure uses zirconia powder including yttria and/or the erbium oxide. It is preferable that both yttria and the erbium oxide are included. Examples of the conventional dental cutting zirconia blank include a dental cutting zirconia blank using 3 mol % of yttria stabilized zirconia.

In contrast, in the present disclosure, partially stabilized zirconia containing 4 to 15 mol % of yttria and/or the erbium oxide is used. It is preferable that partially stabilized zirconia containing 4 to 6 mol % of yttria and/or the erbium oxide is used. Other stabilizers may be used in addition to yttria and erbium oxide. When the content of yttria and/or the erbium oxide is less than 4 mol %, transparency may decrease. In addition, when the content of yttria and/or the erbium oxide is more than 15 mol %, strength may decrease.

The zirconia powder to use may contain a pigment component for the coloration. Examples of the pigment component include iron oxide, cobalt oxide, oxidation manganese, oxidation praseodymium. The zirconia powder added with these pigment component compositely may be used.

It is preferable that the dental cutting zirconia blank of the present disclosure has the multi-layer structure and the number of the layers is not particularly limited, but may be 2 to 7 layers having different color tones and different transparencies preferably.

When the dental cutting zirconia blank of the present disclosure has a multi-layer structure, it is preferable that boundaries of each layer which constitutes the dental cutting zirconia blank is substantially parallel each other, and it is more preferable that the boundaries of each layer is parallel each other. In the dental cutting zirconia blank of the present disclosure, each layer may have a curved surface without any problems. In this case, a surface opposing to an adjacent layer in each layer preferably has a shape which is similar to a shape of surface opposing to the adjacent layer in other layer. Further, when a pair of opposed surfaces of the layer are adjacent to other layers, it is preferable that the pair of opposed surfaces have a similar shape each other.

The dental cutting zirconia blank of the present disclosure may have any shape such as a cylindrical disc shape to have 98 to 110 mm of diameter, or a substantially cubic block shape to have one side of 10 to 30 mm.

In addition, when the dental cutting zirconia blank of the present disclosure has a multilayer structure, the multilayer structure may include one or more layers consisting of zirconia powder containing 4 to 15 mol % of yttria and/or the erbium oxide, and may include other layer which is obtained by pre-sintering zirconia powder containing less than 4 mol % or more than 15 mol % of yttria and/or the erbium oxide. It is preferable that all layers consist of zirconia powder containing 4 to 15 mol % of yttria and/or the erbium oxide. In addition, when the other layer which is obtained by pre-sintering zirconia powder containing less than 4 mol % or more than 15 mol % of yttria and/or the erbium oxide is included, it is preferable that a ratio of the dimensions of the total of the thickness of the other layer which is obtained by pre-sintering zirconia powder containing less than 4 mol % or more than 15 mol % of yttria and/or the erbium oxide in the whole dimension from the outer surface of the E layer to the outer surface of the C layer of the dental cutting zirconia blank is less than 50%. In other words, when the dental cutting zirconia blank of the present disclosure has a multilayer structure, it is preferable that a ratio of the dimensions of the total of the thickness of the layer consisting of zirconia powder containing 4 to 15 mol % of yttria and/or the erbium oxide in the whole dimension from the outer surface of the E layer to the outer surface of the C layer of the dental cutting zirconia blank is 20% or more.

When the dental cutting zirconia blank of the present disclosure has the multilayer structure, it is preferable that the multilayer structure include three or more layers having an enamel color tone layer (E layer), a cervical color tone layer (C layer) and a middle color tone layer (M layer), and has three or more different color tones. In this case, it is preferable that the layers corresponding to the E layer, the C layer and the M layer consist of zirconia powder containing 4 to 15 mol % of yttria and/or the erbium oxide.

As a specific constitution of the dental cutting zirconia blank, the E layer which has the lowest saturation is positioned on one of the uppermost layer and the lowermost layer of the dental cutting zirconia blank, the C layer which has the highest saturation is positioned on the other of the uppermost layer and the lowermost layer of the dental cutting zirconia blank and the M layer is positioned between the E layer and the C layer. In this case, it is preferable that the saturations (E layer: $C_E$, C layer: $C_C$, M layer: $C_M$) and the brightnesses (E layer: $L_E$, C layer: $L_C$, M layer: $L_M$) in each layer satisfy the following relations:

$$\{(L_E+L_C)/2\} \times 0.97 < L_M < \{(L_E+L_C)/2\} \times 1.03$$

$$\{(C_E+C_C)/2\} \times 0.93 < C_M < \{(C_E+C_C)/2\} \times 1.07$$

$$C_C > C_M > C_E$$

When $L_M$ is not within the above range, transparency may be impaired. When $C_M$ is not within the above range, aesthetic properties may be impaired. When the relation $C_C > C_M > C_E$ is not satisfied, aesthetic properties may be impaired by being far apart from the color tone of the natural tooth. Further, in the above case, it is preferable that the chromaticities of E layer ($L_E$, $a_E$, $b_E$) based on the L*a*b* colorimetric system satisfy the following relations:

$$65.0 \leq L_E \leq 82.0$$

$$-4.0 \leq a_E \leq 2.0$$

$$0.0 \leq b_E \leq 20.0$$

More preferably, the chromaticities satisfy the following relations:

$$69.0 \leq L_E \leq 80.0$$

$$-3.0 \leq a_E \leq 1.0$$

$$2.0 \leq b_E \leq 15.0$$

Further, in this case, the chromaticities of the M layer ($L_M$, $a_M$, $b_M$) based on the L*a*b* colorimetric system in the dental cutting zirconia blank is not particularly limited as long as the above relations based on the saturations and the brightnesses in the C layer and the chromaticities of the E layer based on the L*a*b* colorimetric system, but preferably satisfy the following relations:

$$67.0 \leq L_M \leq 78.0$$

$$-2.5 \leq a_M \leq 1.0$$

$$5.0 \leq b_M \leq 15.0$$

[Measurement of the Chromaticities]

For measurement of the chromaticities based on the L*a*b* colorimetric system, each layer in the dental cutting zirconia blank of the present disclosure is molded into a disc of 15 mm in diameter and 1.0 mm in thickness, and the molded body is sintered and/or cured appropriately, and both faces of the molded body is polished smooth. A device for measurement of the chromaticities, manufactured by Olympus Corporation under the trade name of CE100-DC/US, is used for measurement. The condition of measurement of the chromaticities is as follow: Light source: C light source, Angle of visibility: 2°, Background color: White.

[Contrast Ratio]

The optical transparency of each layer in the dental cutting zirconia blank of the present disclosure is not particularly limited, but when the optical transparency of each layer is expressed by a contrast ratio, a contrast ratio is preferably within the range of 0.55 to 0.90, more preferably within the range of 0.65 to 0.90. A contrast ratio is a measure of representing a transparency. A contrast ratio is calculated from Y value of XYZ color system which is defined in JIS Z8701. Among the tristimulus values, Y relates to brightness. Specifically, the sample plate with a thickness of 1.0 mm are placed on a black or white background. The standard light C is irradiated and the Y value of the reflected light is measured. When the background is black, the Y is referred to Yb. When the background is white, the Y is referred to Yw. The contrast ratio (C) is obtained from Yb/Yw. When the C value is close to 1, the materials are opaqueness. When the C value is close to zero, the materials are transparency.

When the dental cutting zirconia blank of the present disclosure has the multilayer structure, the E layer is preferably positioned from the surface of the dental cutting zirconia blank of the E layer-side to a position spaced from the surface of the dental cutting zirconia blank of the E layer-side by 15 to 30%, more preferably 20 to 30% of the dimension between the surface of dental cutting zirconia blank of the E layer-side and the surface of the dental cutting zirconia blank of the C layer-side. In other words, the E layer is preferably positioned from the outer surface of the E layer toward the outer surface of C layer to a position spaced from the outer surface of the E layer by 15 to 30%, more preferably 20 to 30%, of the dimension between the outer surface of the E layer and the outer surface of the C layer.

The M layer is preferably positioned from a position spaced from the surface of the dental cutting zirconia blank of the E layer-side by more than 15%, more preferably more than 25%, to a position spaced from the surface of the dental cutting zirconia blank of the E layer-side by 40% or less of the dimension between the surface of the dental cutting zirconia blank of the E layer-side and the surface of the dental cutting zirconia blank of the C layer-side. In other words, M layer is preferably positioned from a position spaced from the outer surface of the E layer toward the outer surface of C layer by more than 15%, more preferably more than 25%, to a position spaced from the outer surface of the E layer by 40% or less of the dimension between the outer surface of the E layer and the outer surface of the C layer. That is, the maximum ratio of the thickness of the M layer in the direction from the outer surface of the E layer toward the outer surface of the C layer of the dental cutting zirconia blank is 25%. Preferable thickness of the M layer in the direction from the outer surface of the E layer toward the outer surface of the C layer of the dental cutting zirconia blank is within the range of 10 to 15%.

When the dental cutting zirconia blank of the present disclosure has four layers, one middle layer is positioned between the M layer and the C layer or between the E layer and the M layer.

When the dental cutting zirconia blank of the present disclosure has five layers, two middle layers having different color tone each other are positioned between the M layer and the C layer or between the E layer and the M layer, or, one middle layer among the two middle layers is positioned between the M layer and the C layer and other middle layer is positioned between the E layer and the M layer. In these cases, it is preferable that the M layer and E layer are adjacent each other. The gradation of the color becomes beautiful visually so that there are many numbers of the layer. However, reproducibility of the color tone of the natural tooth may be sufficiently obtained from the dental cutting zirconia blank having 4 to 7 layers, preferably 4 to 5 layers.

The thickness of the middle layer positioned between the M layer and the C layer or between the E layer and the M layer is not particularly limited. In view of the thickness of the E layer, the M layer and the middle layer, the C layer is preferably positioned from a position spaced from the surface of the dental cutting zirconia blank of the E layer-side by 50%, more preferably 60%, to a position spaced from the surface of the dental cutting zirconia blank of the E layer-side by 100%, of the dimension between the outer surface of the E layer and the outer surface of the C layer. That is, the maximum ratio of the thickness of the C layer in the direction from the outer surface of the E layer toward the outer surface of the C layer of the dental cutting zirconia blank is 50%. Preferable thickness of the C layer in the direction from the outer surface of the E layer toward the outer surface of the C layer of the dental cutting zirconia blank is within the range of 30 to 40%.

When a boundary surface between the layers has curved shape, the positions of the E layer, the M layer, the middle layer and the C layer are determined by a perpendicular line to the surface of the E layer from the center of the gravity. The reason is that a cavity of a dental crown is positioned in the neighborhood of this portion when a dental crown form is cut.

When the dental cutting zirconia blank of the present disclosure has four layers, it is preferable that the E layer which has the lowest saturation and the C layer which has the highest saturation are respectively positioned in parallel on the uppermost layer and the lowermost layer of the dental cutting zirconia blank. On the basis of the premise that an edge extending from the E layer to the C layer in the dental cutting zirconia blank of the present disclosure adapts to the dental crown lengthwise direction, the layer structure extending from the E layer to the C layer can be assumed as the layer structure extending from the cut end portion of the dental crown to the dental cervical portion. On the other hand, in a natural tooth, the cut end portion is structurally constituted only with an enamel and exhibits an enamel color, and the enamel gets thinner toward the dental cervical portion, and the cervical color is correspondingly enhanced. In the dental cutting zirconia blank of the present disclosure, the E layer may be designed so as to have an enamel color and the C layer may be designed so as to have a cervical color.

In the dental cutting zirconia blank of the present disclosure, the E layer has the lowest saturation $C_E$, the C layer has the highest saturation $C_C$ and the saturation of the M layer $C_M$ satisfy the relation $\{(C_E+C_C)/2\}\times 0.93 \leq C_M \leq \{(C_E+C_C)/2\}\times 1.07$. Therefore, it is preferable that the relationship of the saturations in each layer satisfies $C_C > C_M > C_E$. When the middle layer M2 is positioned between the M layer and the C layer, the basic relationship is $C_C \geq C_{M2} \geq C_M > C_E$, however the relationship is not limited the basic relationship. Further, when the number of the middle layer between the M layer and the C layer increase such as two layers or three layers, the design of the color tone is complicated. However, there is no problem even if the saturations are in order or even if a part of saturations is in reverse order. However, it is preferable that the relationship of the saturations of the middle layer between the M layer and the C layer are in order.

In the dental cutting zirconia blank of the present disclosure, it is preferable that the E layer and the C layer have 80 or more Vickers hardness (load: 1 kgf). In the present disclosure, Vickers hardness is measured according to JIS T 6517. When Vickers hardness is less than 80, processing defects may occur in CAD/CAM machining device.

In the dental cutting zirconia blank of the present disclosure, it is preferable that 0.20 wt. % of alumina is contained in order to improve the sinterability.

The form of materials used for preparing the dental cutting zirconia blank of the present disclosure is not particularly limited. Any form such as a powder form including only zirconia, a slurry form prepared by adding zirconia powder in a solvent and a paste form prepared by binding zirconia powder may be used without no limitation as long as a molding body may be prepared by molding into the predetermined shape.

In addition, the method for preparing a molding body is not particularly limited, and any method can also be adopted. Examples include the press molding, the slip cast, the injection molding, the photo fabrication. Further, CIP molding (Cold Isostatic Pressing) may be performed after the press molding as described in the Examples in the present specifications.

A dental prosthesis device may be prepared from the dental cutting zirconia blank of the present disclosure by cutting and machining pre-sintered body of the dental cutting zirconia blank using CAD/CAM system and by perfect sintering the cut product. Preferable perfect sintering methods include high-speed sintering with the machines such as a pulse wave, an electromagnetic wave and a high frequency. With regard to the high-speed sintering, sintering may be performed at 50° C./minute or more, preferably 100° C./minute or more, of temperature rising rate. In the perfect sintering, it is preferable that the sintering temperature is within the range of 1,350 to 1,550° C.

EXAMPLES

Hereinafter, the present disclosure is described by way of Examples in more detail and specifically, but the present disclosure is not limited to these Examples. In the Examples, a description of dental cutting zirconia blank using zirconia powder is given.

[Preparation of Zirconia Powder in Each Layer]

Four kinds of powder, zirconia powder (white), zirconia powder (dark brown), zirconia powder (pinkness) and zirconia powder (gray color), were used. The four kinds of powder respectively contained yttria and erbium oxide with the binder at the ratio shown in Table 1. The compounding ratio of yttria and the erbium oxide was 80:2. The four kinds of powder were mixed at appropriate ratio so that the E layer, the M layer and the C layer respectively had a desired color and optical transparency (contrast ratio) to constitute a three layer structure including the E layer, the M layer and the C layer. In addition, by adjusting the quantity of powder, the color transition ratio from the E layer to the M layer was adjusted.

[Preparation of Columnar Block]

Predetermined quantity of the above zirconia mixture powder were filled in the E layer, the M layer and the C layer of ϕ50 mm molding die and press molding was performed by pressure of 10 kN for one minute. After the press molding, CIP molding was performed by pressure of 200 MPa for one minute. Degreasing was performed by heating at 50° C./hour of temperature rising rate to 500° C., retaining for two hours and cooling at 100° C./hour of temperature drop rate to room air temperature. After degreasing, a pre-sintered body was prepared by heating at 100° C./hour of temperature rising rate to 1000 to 1200° C., retaining for two hours and furnace cooling. The pre-sintered body was cut and machined to prepare a columnar block having 30 mm of diameter and 20 mm of height. Filling amounts of the E layer, the M layer and C layer were adjusted so that the three layers including the E layer, the M layer and the C layer were layered in 20 mm of height direction of the columnar block. The diameter, the height and the mass of the pre-sintered body were measured to calculate a pre-sintering density. Furthermore, the Vickers hardness and the density of the pre-sintered body were measured. In the measurement of the Vickers hardness, the load was 1 kgf. In addition, the position of the edge of the M layer of the E layer side in the height direction was calculated from the ratio of the E layer in the block having 20 mm of height. Specifically, when the E layer positions from the edge of the E layer to 6 mm in the height direction of the block having 20 mm of height, the position of the edge of the M layer of the E layer side is 30%.

A tooth crown shape (single crown) was prepared from the above columnar block by using CAD data and the processing test was performed on the tooth crown shape by using a processing machine of DWX-50 (product made in Roland Corporation). The chipping on processing was evaluated on five scale. The rating criteria are as follows.
5: No chipping
4: Including chipping which was 0.01 μm or less and was not confirmed by visual observation
3: Including chipping which was 0.1 to more than 0.01 μm and was used in clinical.
2: Including chipping which was 20 to more than 0.1 μm and was used in clinical.
1: Including the largest chipping which was more than 20 μm.

In addition, the processing time required for processing was measured. When the processing time was within 45 minutes, the evaluation was usable in clinical.

[Standard Color Tone]

The E layer, the M layer and the C layer were cut from the prepared columnar block, and the diameter was adjusted to 30 mm and the thickness was adjusted to 1.0 mm to prepare a sample for measurement of the standard color tone. The sample was heated at 100° C./hour of temperature rising rate, retaining at 1,450° C. for two hours and the standard color tones of the E layer, the M layer and the C layer were measured.

In addition, the prepared columnar block was heated at 100° C./hour of temperature rising rate by 1,450° C., retaining for two hours to prepare a perfect sintered body. The diameter, the height and the mass of the perfect sintered body were measured to calculate a perfect-sintering density.

[Color Tone and Color Difference of High-Speed Sintering]

On the other hand, the E layer, the M layer and the C layer were cut from the prepared columnar block, and the diameter was adjusted to 30 mm and the thickness was adjusted to 1.0 mm. Adjusted articles were heated at 100° C./minute of temperature rising rate to 1,450° C. using a high frequency microwave (millimeter wave of 28 GHz) and retained for 30 minutes to prepare a sample for high-speed sintering. The measurement of the color tone of the sample for high-speed sintering was performed like the standard sample and the color difference with the standard color tone was calculated. The color difference was calculated by the following expression. When the color difference was 0.1 or less, the evaluation was usable in clinical. The color difference was calculated from the color tone of standard sintering ($L_S$, $a_S$, $b_S$) and the color tone of the high speed high-speed sintering article ($L_H$, $a_H$, $b_H$) using a high frequency microwave.

$$\Delta E = \sqrt{((L_S - L_H)^2 + (a_S - a_H)^2 + (b_S - b_H)^2)}$$

(Measurement of Chromaticity and Contrast Ratio)

The sample having the thickness of 1.0 mm was subjected to the measurement of the L*a*b* value over a white background by using a spectrocolorimeter (CM-3500d: Konica Minolta).

The color index (L*, a*, b*) and the saturation C* were calculated. The rating criteria were as follow:
○: Satisfy following relational expression
x: Not satisfy following relational expression.

The brightness and the saturation were calculated by the above mentioned expression.

$$L_M = (L_E + L_C)/2 \times 0.97 \sim 1.03$$

$$C_M = (C_E + C_C)/2 \times 0.93 \sim 1.07$$

$$C_C > C_M > C_E$$

Examples 1 to 12 and Comparative Examples 1 to 4 were prepared.

TABLE 1

|  | Example 1 | Example 2 | Example 3 | Example 4 |
|---|---|---|---|---|
| Content of yttria and the erbium oxide in composition (mol %) | 5.5 | 5.5 | 5.5 | 7.0 |
| Standard color tone of E layer | | | | |
| L* | 69.5 | 69.5 | 69.5 | 71.6 |
| a* | −2.0 | −2.0 | −2.0 | −2.5 |
| b* | 9.1 | 9.1 | 9.1 | 3.0 |
| C* | 9.3 | 9.3 | 9.3 | 3.9 |
| Standard color tone of M layer | | | | |
| L* | 68.1 | 68.1 | 68.1 | 70.2 |
| a* | −1.1 | −1.1 | −1.1 | −1.8 |
| b* | 10.6 | 10.6 | 10.6 | 6.7 |
| C* | 10.7 | 10.7 | 10.7 | 6.9 |
| Standard color tone of C layer | | | | |
| L* | 67.5 | 67.5 | 67.5 | 68.2 |
| a* | −0.1 | −0.1 | −0.1 | −1.1 |
| b* | 13.2 | 13.2 | 13.2 | 10.3 |
| C* | 13.2 | 13.2 | 13.2 | 10.4 |
| Edge position of M layer (%) | 17.5 | 15 | 15 | 17.5 |
| Vickers hardness of E layer | 81 | 85 | 95 | 81 |
| Vickers hardness of C layer | 81 | 85 | 95 | 81 |
| Relative density (%) | 56 | 61 | 66 | 56 |
| Color difference ΔE between color tone of high-speed article and Standard color tone | 0.01 | 0.005 | 0.003 | 0.01 |
| Relational expression of brightness and the saturation in M layer | ○ | ○ | ○ | ○ |
| Chipping on machining | 5 | 4 | 3 | 5 |
| Machining time (min) | 30 | 40 | 45 | 30 |

TABLE 2

|  | Example 5 | Example 6 | Example 7 | Example 8 |
|---|---|---|---|---|
| Content of yttria and the erbium oxide in composition (mol %) | 7.0 | 7.0 | 5.5 | 5.5 |
| Standard color tone of E layer | | | | |
| L* | 71.6 | 71.6 | 71.6 | 69.5 |
| a* | −2.5 | −2.5 | −2.5 | −2.0 |
| b* | 3.0 | 3.0 | 3.0 | 9.1 |
| C* | 3.9 | 3.9 | 3.9 | 9.3 |
| Standard color tone of M layer | | | | |
| L* | 70.2 | 70.2 | 70.5 | 68.1 |
| a* | −1.8 | −1.8 | −1.8 | −1.1 |
| b* | 6.7 | 6.7 | 5.2 | 10.6 |
| C* | 6.9 | 6.9 | 5.5 | 10.7 |
| Standard color tone of C layer | | | | |
| L* | 68.2 | 68.2 | 68.2 | 67.5 |
| a* | −1.1 | −1.1 | −1.1 | −0.1 |
| b* | 10.3 | 10.3 | 10.3 | 13.2 |
| C* | 10.4 | 10.4 | 10.4 | 13.2 |
| Edge position of M layer (%) | 17.5 | 17.5 | 17.5 | 17.5 |
| Vickers hardness of E layer | 85 | 95 | 91 | 70 |
| Vickers hardness of C layer | 86 | 94 | 91 | 81 |
| Relative density (%) | 61 | 66 | 55 | 55 |
| Color difference ΔE between color tone of high-speed article and Standard color tone | 0.005 | 0.003 | 0.003 | 0.01 |
| Relational expression of brightness and the saturation in M layer | ○ | ○ | x | ○ |
| Chipping on machining | 4 | 3 | 5 | 5 |
| Machining time (min) | 40 | 45 | 30 | 30 |

TABLE 3

|  | Example 9 | Example 10 | Example 11 | Example 12 |
|---|---|---|---|---|
| Content of yttria and the erbium oxide in composition (mol %) | 15.0 | 15.0 | 15.0 | 15.0 |
| Standard color tone of E layer | | | | |
| L* | 65.4 | 64.2 | 63.8 | 64.8 |
| a* | −2.5 | −2.5 | −2.5 | −2.0 |
| b* | 3.0 | 3.0 | 3.0 | 9.1 |
| C* | 3.9 | 3.9 | 3.9 | 9.3 |
| Standard color tone of M layer | | | | |
| L* | 64.2 | 63.1 | 62.7 | 63.1 |
| a* | −1.8 | −1.8 | −1.8 | −1.1 |
| b* | 6.7 | 6.7 | 5.2 | 10.6 |
| C* | 6.9 | 6.9 | 5.5 | 10.7 |
| Standard color tone of C layer | | | | |
| L* | 63.5 | 62.2 | 61.7 | 62.8 |
| a* | −1.1 | −1.1 | −1.1 | −0.1 |
| b* | 10.3 | 10.3 | 10.3 | 13.2 |
| C* | 10.4 | 10.4 | 10.4 | 13.2 |
| Edge position of M layer (%) | 17.5 | 17.5 | 17.5 | 17.5 |
| Vickers hardness of E layer | 85 | 95 | 91 | 70 |
| Vickers hardness of C layer | 86 | 94 | 91 | 81 |
| Relative density (%) | 61 | 70 | 55 | 55 |
| Color difference ΔE between color tone of high-speed article and Standard color tone | 0.005 | 0.003 | 0.003 | 0.01 |
| Relational expression of brightness and the saturation in M layer | ○ | ○ | x | ○ |
| Chipping on machining | 4 | 3 | 5 | 5 |
| Machining time (min) | 40 | 45 | 30 | 30 |

TABLE 4

|  | Comparative Example 1 | Comparative Example 2 | Comparative Example 3 | Comparative Example 4 |
|---|---|---|---|---|
| Content of yttria and the erbium oxide in composition (mol %) | 5.5 | 3.0 | 5.5 | 18 |
| Standard color tone of E layer | | | | |
| L* | 69.5 | 79.1 | 71.6 | 62.1 |
| a | −2.0 | −1.5 | −2.5 | −3.5 |
| b* | 9.1 | 3.8 | 3.0 | 12.2 |
| C* | 9.3 | 4.1 | 3.9 | 12.2 |
| Standard color tone of M layer | | | | |
| L* | 68.1 | 75.7 | 70.2 | 61.2 |
| a | −1.1 | −0.9 | −1.8 | −2.7 |
| b* | 10.6 | 9.5 | 6.7 | 13.3 |
| C* | 10.7 | 9.5 | 6.9 | 13.2 |
| Standard color tone of C layer | | | | |
| L* | 67.5 | 72.8 | 68.2 | 60.5 |
| a | −0.1 | −0.3 | −1.1 | −1.7 |
| b* | 13.2 | 14.5 | 10.3 | 16.6 |
| C* | 13.2 | 14.5 | 10.4 | 16.5 |
| Edge position of M layer (%) | 17.5 | 17.5 | 17.5 | 17.5 |
| Vickers hardness of E layer | 53 | 70 | 101 | 56 |
| Vickers hardness of C layer | 53 | 70 | 100 | 56 |
| Relative density (%) | 51 | 55 | 72 | 55 |
| Color difference ΔE between color tone of high-speed article and Standard color tone | 3.0 | 2.0 | 0.005 | 1.1 |
| Relational expression of brightness and the saturation in M layer | ○ | x | ○ | x |
| Chipping on machining | 5 | 5 | 1 | 5 |
| Machining time (min) | 30 | 40 | 90 | 30 |

Consideration of Examples

In examples 1 to 12 of the present disclosure, the color tone which is not different from that of the normal sintering was obtained by high-speed sintering, processing time was appropriate with less than 45 minutes, and chipping was not substantially observed. On the other hand, in Comparative Example 1, because the relative density was low, the color tone which is the same as that of the normal sintering was not obtained by high-speed sintering. In Comparative Example 2, the satisfactory color tone was not provided, and the color development which is the same as that of the normal sintering was not obtained by high-speed sintering. In Comparative Example 3, because relative density was high, very long time was required for processing the crown, and there was much chipping in processing, and therefore it was impossible to use clinically. In Comparative Example 4, because the amount of stabilizer was too much, and poor color development was caused at the time of high-speed sintering.

With respect to the use of substantially any plural and/or singular terms herein, those having skill in the art can translate from the plural to the singular and/or from the singular to the plural as is appropriate to the context.

Although the description herein has been given with reference to the drawings and embodiments, it should be noted that those skilled in the art may make various changes and modifications on the basis of this disclosure without difficulty. Accordingly, any such changes and modifications are intended to be included in the scope of the embodiments.

INDUSTRIAL APPLICABILITY

This disclosure can provides a prosthesis device having high esthetics by high-speed sintering of a multi layer ceramics which is used for cutting and machining with the CAD/CAM system in the dental field.

What is claimed is:

1. A pre-sintered body of a dental cutting zirconia blank comprising at least three layers having different color tones,
wherein at least one layer consists of zirconia powder containing 4 to 15 mol % of yttria and erbium oxide as a stabilizer,
wherein the pre-sintered body of the dental cutting zirconia blank becomes usable in an oral cavity by a process comprising:
a step of cutting and machining the pre-sintered body of the dental cutting zirconia blank, and
a step of perfect-sintering the cut and machined pre-sintered body of the dental cutting zirconia blank to a state usable in the oral cavity,
wherein the pre-sintered body of the dental cutting zirconia blank satisfies the following relationship:

$$54 \leq \text{Relative density}(\%) = \{(\text{Pre-sintering density})/(\text{Perfect-sintering density})\} \times 100 \leq 70$$

wherein the Pre-sintering density indicates a density of the pre-sintered body of the dental cutting zirconia blank, and the Perfect-sintering density indicates a density of the dental cutting zirconia blank in use in the oral cavity, and
wherein the at least three layers include:
an E layer which has the lowest saturation after perfect-sintering and is positioned on one of an uppermost layer or a lowermost layer of the pre-sintered body of the dental cutting zirconia blank,
a C layer which has the highest saturation after perfect-sintering and is positioned on the other of the uppermost layer or the lowermost layer of the pre-sintered body of the dental cutting zirconia blank, and
an M layer which is positioned between the E layer and the C layer, and
wherein the saturations after perfect-sintering (E layer: $C_E$, C layer: $C_C$, M layer: $C_M$) the brightness after perfect-sintering (E layer: $L_E$, C layer: $L_C$, M layer: $L_M$) in each layer satisfy the following relations:

$$\{(L_E+L_C)/2\} \times 0.97 < L_M < \{(L_E+L_C)/2\} \times 1.03$$

$$\{(C_E+C_C)/2\} \times 0.93 < C_M < \{(C_E+C_C)/2\} \times 1.07$$

$$C_C > C_M > C_E, \text{ and}$$

a content of yttria in mol % in the at least three layers is constant.

2. The pre-sintered body of the dental cutting zirconia blank of claim 1, wherein,
the chromaticities of the E layer after perfect-sintering ($L_E$, $a_E$, $b_E$) based on the L*a*b* colorimetric system satisfy the following relations:

$$65.0 \leq L_E \leq 82.0$$

$$-4.0 \leq a_E \leq 2.0$$

$$0.0 \leq b_E \leq 20.0.$$

3. The pre-sintered body of the dental cutting zirconia blank of claim 1, wherein the at least three layers are positioned in the following order:
the E layer occupying from a first surface of the pre-sintered body of the dental zirconia blank to a depth of 15 to 30% of the pre-sintered body of the dental zirconia blank;
the M layer occupying a position above or below the E layer to a depth of up to 40% from the first surface of the pre-sintered body of the dental zirconia blank; and
the C layer positioned at a second surface that is opposite the first surface.

4. The pre-sintered body of the dental cutting zirconia blank of claim 1, wherein,
the M layer and the E layer are adjacent to each other.

5. The pre-sintered body of the dental cutting zirconia blank of claim 1, wherein,
the E layer and the C layer have 80 or more Vickers hardness (load: 1 kgf).

6. A dental prosthesis device prepared by
cutting and machining the pre-sintered body of the dental cutting zirconia blank of claim 1 using dental CAD/CAM system, and
heating at 50° C./minute or more of temperature rising rate and sintering.

7. A dental prosthesis device prepared by
cutting and machining the pre-sintered body of the dental cutting zirconia blank of claim 2 using dental CAD/CAM system, and
heating at 50° C./minute or more of temperature rising rate and sintering.

8. A dental prosthesis device prepared by
cutting and machining the pre-sintered body of the dental cutting zirconia blank of claim 3 using dental CAD/CAM system, and
heating at 50° C./minute or more of temperature rising rate and sintering.

9. A dental prosthesis device prepared by
cutting and machining the pre-sintered body of the dental cutting zirconia blank of claim 4 using dental CAD/CAM system, and
heating at 50° C./minute or more of temperature rising rate and sintering.

10. A dental prosthesis device prepared by
cutting and machining the pre-sintered body of the dental cutting zirconia blank of claim 5 using dental CAD/CAM system, and
heating at 50° C./minute or more of temperature rising rate and sintering.

* * * * *